Feb. 6, 1968  F. FORMANDO  3,367,544
DISPENSING DEVICE HAVING SEALING MEANS
Filed June 27, 1966
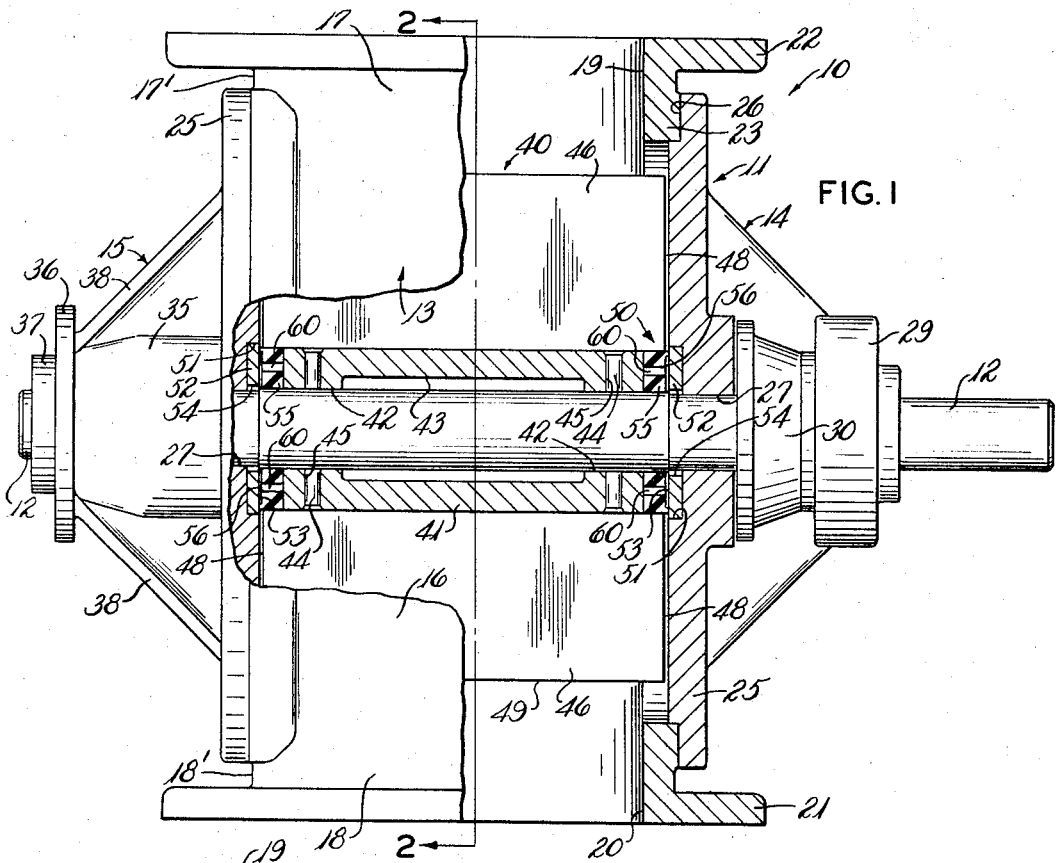
FIG. 1
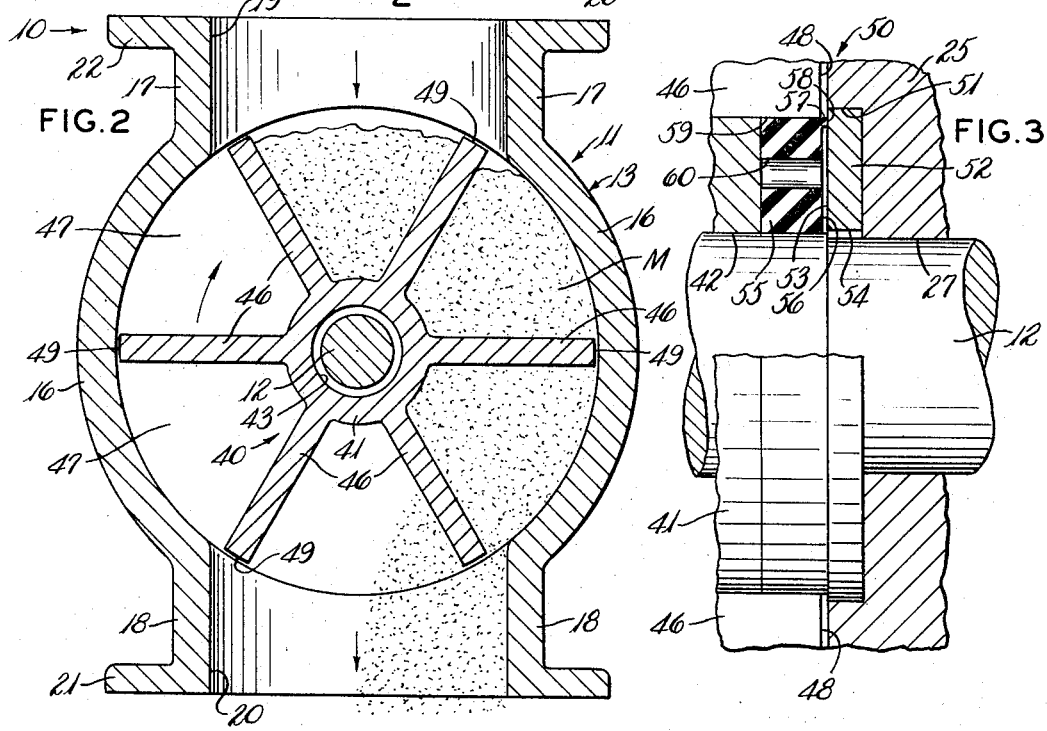
FIG. 2
FIG. 3

United States Patent Office 3,367,544
Patented Feb. 6, 1968

3,367,544
DISPENSING DEVICE HAVING SEALING MEANS
Frank Formando, Pottstown, Pa., assignor to The Firestone Tire & Rubber Company, Akron, Ohio, a corporation of Ohio
Filed June 27, 1966, Ser. No. 560,774
3 Claims. (Cl. 222—368)

ABSTRACT OF THE DISCLOSURE

A dust seal for a rotating shaft extending through a housing and carrying a rotor therein with blades proximate the housing having an annular insert in said housing radially spaced from said rotating shaft and having a sealing ring in the rotor with a narrow lip projecting axially to engage the annular insert, thereby providing an efficient seal with minimal heat buildup.

---

The present invention relates generally to seals for rotating members. More particularly, the invention relates to dust seals applied along rotating shafts to prevent the travel of granulated solids axially thereof. Specifically, the invention relates to seals for prohibiting the escape of powdered resins or other granulated solids from a housing or casing having a rotating shaft extending through at least one wall.

In recent years technical developments have greatly expanded the potential uses for resins and similar organic materials. These advances have brought about the necessity for processing the materials under conditions of controlled pressure and temperature. As these processes have been systematically automated, it becomes increasingly necessary to transport the materials from one location to another and from one environment to a different environment.

A particularly troublesome area has developed with respect to the processing of powdered resin materials which must be maintained free of impurities to avoid discontinuities in the finished product. Powdered resins are commonly transported between processing stations or locations by a sealed endless screw device or other similar mode of conveyance and introduced into dryers or other processing equipment by means of rotary air locks. These devices normally employ a shaft or rotating member which extends through a wall in a hopper or housing which contains the powdered material. In the past, rotary seals have been employed to prevent the escape of the powdered material and the entrance of impurities present in the exterior environment.

Rotary seals for these applications have conventionally consisted of an annular disk of felt or comparable material carried by the shaft and engaging a wall of the container or a radial bushing member engaging the shaft to effect the requisite closure. A primary problem with seals of these types is their tendency to form lumps or chunks in a powdered thermoplastic or other material which must be later removed to avoid discontinuities in the final product. Although the felt material is desirable for the purpose of minimizing frictionally developed heat, there is a pronounced tendency to roll or ball up the powdered material and sufficient heat is present to fuse the balls into clumps or chunks. The difficulty and cost of removing these particles from the powdered material dictates that they be tolerated, where possible, as defects in the final products.

Accordingly, a principal object of the present invention is to provide a dust seal for a rotating member which prevents escape of granulated solids and prohibits the entrance of impurities. Another object of the invention is to provide a seal having minimal tendencies to ball up or compress powdered resin. A further object of the invention is to provide a seal having a minimum contact area and low coefficient of friction to reduce the friction force and attendant heat buildup.

An additional object of the invention is to provide a dust seal which is particularly adapted for the shaft of a rotary air lock, wherein powdered resin is delivered from a source of supply to a dryer, or other processing equipment, having a pressure differential. Still another object of the invention is to provide a seal which will accomplish the above objectives without external means of lubrication and cooling. Other objects are to provide a dust seal which is inexpensive, easy to replace, and adaptable to existing shaft seal configurations with minor alterations thereto. Various other objects and advantages will appear from the following description taken in conjunction with the attached drawings, and the novel features will be particularly pointed out hereinafter in conjunction with the appended claims.

In the drawings:

FIG. 1 is a side elevation of a rotary air lock with the housing broken away and selected portions shown in section to expose the shaft seal constructed according to the present invention.

FIG. 2 is a section view depicting the flow of a granulated solid through the elements of the rotary air lock of FIG. 1 and taken substantially on line 2—2 of FIG. 1.

FIG. 3 is an enlarged fragmentary side elevation of the rotary air lock of FIG. 1 with portions broken away or shown in section to reveal the details of the shaft seal embodying the principles of the present invention.

Referring now to the drawings and particularly to FIGS. 1 and 2, a rotary air lock, generally indicated by the numeral 10, is depicted as an exemplary environment for the shaft seal according to the present invention. A housing, generally indicated by the numeral 11, totally encases the components of rotary air lock 10, including the shaft seals, and supports the through shaft 12 projecting from either side. The housing 11 may have a somewhat cylindrical body portion, generally indicated by the numeral 13, with tapered ends, generally indicated by the numerals 14 and 15, respectively, which approximate a truncated cone in overall configuration and encompass or encase a length of the shaft 12.

The cylindrical body portion 13 has a pair of opposed curved sides 16, each merging into integral arcuate legs 17 and 18, at the upper and lower extremities of the curved sides 16, respectively. In conjunction with transverse portions 17' and 18' of body portion 13 above and below the tapered ends 14, 15, the legs 17 and 18 form an input opening 19 and an output opening 20, respectively, which are preferably of generally cylindrical configuration. The struts 17, 18 may terminate in flanges 21 and 22 at their radially outward extremities to facilitate attachment of conduits or other apparatus (not shown) to the housing 11. In the rotary air lock 10 depicted herein, a powdered resin or other granulated solid M is gravity fed through the upper input opening 19 and exits in a similar manner through the lower output opening 20, wherein a different pressure would normally prevail.

Referring now to FIG. 1 particularly, the axial extremities of the curved sides 16 of cylindrical body portion 13 have annular radial flanges 23 to engage and receive the tapered ends 14, 15. For purposes of the present invention, the primary component of each of the tapered ends 14, 15 is a head plate 25 which may be substantially circular with a radially outer axial recess or groove 26 which seats against the annular radial flanges 23. A through bore 27 is located centrally of each head plate 25 to enclose and support the shaft 12 projecting there-through. As shown, the tapered end 14 of housing 11 encloses the drive end of shaft 12 which may employ a pulley or other power transmission element (not shown) which is mounted on the shaft 12 in nonrotational engagement by means of a feather key or comparable securing device (also not shown). Tapered end 14 may additionally have a collar 29 and a partially conical encasing shell 30 which combine with the pulley to achieve any requisite journaling and external sealing functions for the rotating shaft 12.

The tapered end 15, opposite the drive side tapered end 14, functions to support and house the other end of shaft 12. Projecting from the head plate 25, the primary component of tapered end 15 is a pillow block 35 which encloses and journals the shaft 12 on suitable bearings (not shown) in a well-known manner. The pillow block 35 may be positioned by a sleeve 36 which may be integral therewith and axially retained by collar 37 near its outer extremity. Sleeve 36 is spaced and retained in a desired position with reference to the housing 16 by attached struts 38 which are connected to the head plate 25 by welding or other suitable fastening means.

Intermediate the head plates 25 of housing 11, the shaft 12 carries a rotor assembly, generally indicated by the numeral 40 (FIGS. 1 and 2). The primary portion of the rotor assembly 40 contacting the shaft 12 is a hub 41 having bores 42 at either end adapted to receive the shaft 12. Hub 41 may be provided with a recess or enlarged bore 43 intermediate the end bores 42 for a more adaptable and less expensive construction. The hub 41 is nonrotationally fixed on shaft 12 by one or more taper pins 44 fitted in bores 45, or other suitable low torque fastening means such as set screws or keys. A plurality of angularly spaced vanes 46 project substantially radially outwardly of the hub 40 to create a series of bins or chambers 47 (FIG. 2) for the rotational displacement of the granulated material M. In order for air lock 10 to achieve its sealing function, the axial sides 48 of vanes 46 must be in close proximity to the head plates 25 (FIG. 1). Similarly, in order to prevent leakage outwardly of the vanes 46, the radial extremities 49 must closely but nonengagingly abut the radially inner surface of the curved sides 16 of body portion 13.

With the above-described close construction tolerances for the vanes 46 of rotor 40, each bin or chamber 47 is substantially outwardly gas tight and impervious to the tendency for an equalizing gas flow between input opening 19 and output opening 20. However, the most problematic area is in the vicinity of the rotating member or shaft 12 where a fluid-tight relation is maintained by a seal assembly, generally indicated by the numeral 50, between either end of hub 41 of rotor 40 and the head plates 25 of housing 11. In the present exemplary embodiment as seen particularly in FIGS. 1 and 3, the head plates 25 are provided with counterbores 51 which may conveniently be concentric with through bores 27. The counterbores 51 each receive an annular insert 52 having a radial contact surface 53 and being nonrotationally fixed by virtue of a standard press fit or other appropriate retention means. In order to avoid any possible interference between the annular inserts 52 and the vanes 46 of rotor 40, the contact surfaces 53 are preferably flush or coplanar with the axially inner surface of head plates 25. In addition, annular inserts 52 have center bores 54 which are of slightly greater diameter than the through bores 27 of head plates 25 and the diameter of shaft 12, thereby eliminating contact between the annular inserts 52 and the shaft 25 with the resultant drag and heat buildup.

The mating portion of seal assemblies 50 associated with rotor assembly 40 are sealing rings 55 which have a radial cross section that may be substantially rectangular. The sealing rings 55 each have a radial face 56 projecting axially outwardly of hub 41 and carrying a protruding annular fin or lip 57 which has a radial bearing surface 58 at its extremity. The hub 41 of rotor assembly 40 is provided with a counterbore 59 at either axial extremity which substantially encases a sealing ring 55, except that the fins or lips 57 project axially beyond the vanes 46 and engage the contact surfaces 53 of annular inserts 52. In order to prevent the powdered material M from compacting into balls or clumps between the contact surfaces 53 of annular inserts 52 and the outer faces 56 of sealing rings 55, the annular fins or lips 57 are preferably located at the radially outer extremity of the sealing rings 55. To ensure that the sealing rings 55 rotate with the hub 41, the counterbore 59 may be of appropriate size to achieve a standard press fit; alternatively, or in addition, the sealing rings 55 may be provided with spaced axial holes 60 for machine screws (not shown) or other fasteners which may be inserted into the hub 40.

In order to preclude the heat fusion of the powdered material M in the area of the seal assemblies 50, the sealing surfaces are preferably constructed of materials developing a minimum friction force for a given normal pressure. A preferred material for the sealing ring 55 is a fluorocarbon or fluoroplastic such as tetrafluoroethylene which is produced under a number of trade names including "Teflon" and "Fluorosint." These materials are particularly suitable for bearing surface operation since they have one of the lowest coefficients of friction of any known solid material, have important no-stick characteristics, and have impressive resistance to moisture and vapor permeation. A highly desirable material for the mating annular insert 52 is one of the bronze alloys which has been sintered in a reduced atmosphere to produce a porous surface. Once lubricated, the porous surface will operate in a sealed environment for extended periods of time without the addition of more lubricant. Alternatively, the use of a fluoroplastic for the annular insert 55 would allow the sealing assembly 50 to be operated as a "dry bearing," i.e., without lubricant, under the light and medium duty loading conditions herein contemplated.

A preferred form of the invention has been shown and described in sufficient detail to enable one skilled in the art to practice the invention. It is apparent that the annular insert 52 and the sealing ring 55 could be interchanged with minimum modification to other components and within the scope of the present invention. Since various other modifications in details, materials, and arrangements of parts are within the spirit of the invention herein disclosed and described, the scope of the invention should be limited solely by the scope of the attached claims.

What is claimed is:

1. A dispensing device comprising a housing means, a rotatable shaft member within and extending through said housing means, rotor means fixed on said shaft means within said housing means, annular insert means fixed on one of said means, sealing ring means fixed on the other of said means, and narrow lip means projecting from said sealing ring means and engaging said annular insert means to effect an efficient seal with minimum heat buildup, wherein said housing means comprises a substantially cylindrical body portion and an end portion having a through bore to support said shaft means and a counterbore to receive said annular insert, said annular insert comprises a radial contact surface which is substantially coplanar with said head plate and radially proximate although spaced from said shaft means, said rotor means comprises a hub and a plurality of angularly spaced vanes forming rotating chambers within said housing means and extending radially and axially proximate to said housing means, and said lip means of said sealing ring means comprises an annular projection having a substantially radial face at the radially outward extremity of said sealing ring means and extending axially outwardly of said rotor means.

2. Apparatus according to claim 1, wherein said annular insert means and said sealing ring means are constructed of a fluoroplastic material providing a low coefficient of friction and allowing operation as a dry bearing.

3. Apparatus according to claim 1, wherein said annular insert means is a porous bronze alloy and said sealing ring means is a fluoroplastic material, thereby providing a sealed environment capable of maintaining a lubricant.

References Cited

UNITED STATES PATENTS

| | | | |
|---|---|---|---|
| 2,571,500 | 10/1951 | Trevaskis | 277—96 |
| 2,614,874 | 10/1952 | Helfrecht | 277—96 |
| 2,668,068 | 2/1954 | Bredemeier | 277—96 |
| 2,681,748 | 6/1954 | Weller | 222—368 |
| 2,751,115 | 6/1956 | Kindseth | 222—368 |
| 2,881,015 | 4/1959 | Wahl | 277—96 |
| 3,052,383 | 9/1962 | Transeau | 222—368 |
| 3,093,383 | 6/1963 | Lew | 277—96 |
| 3,151,784 | 10/1964 | Tailor | 222—363 |
| 3,195,902 | 7/1965 | Tisch | 277—95 |
| 3,218,086 | 11/1965 | Donley | 277—96 |

WALTER SOBIN, *Primary Examiner.*